(12) United States Patent
Kasahara

(10) Patent No.: US 10,395,429 B2
(45) Date of Patent: Aug. 27, 2019

(54) IMAGE PROCESSING APPARATUS AND DISPLAY CONTROL METHOD

(71) Applicant: SONY CORPORATION, Tokyo (JP)

(72) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/807,680

(22) Filed: Nov. 9, 2017

(65) Prior Publication Data

US 2018/0068491 A1 Mar. 8, 2018

Related U.S. Application Data

(63) Continuation of application No. 15/378,444, filed on Dec. 14, 2016, now Pat. No. 9,836,887, which is a
(Continued)

(30) Foreign Application Priority Data

Apr. 8, 2011 (JP) .................................. 2011-086684

(51) Int. Cl.
*G06K 9/00* (2006.01)
*H04N 13/239* (2018.01)
(Continued)

(52) U.S. Cl.
CPC ........ *G06T 19/006* (2013.01); *G06K 9/00624* (2013.01); *G06K 9/00671* (2013.01);
(Continued)

(58) Field of Classification Search
USPC ....... 382/100, 103, 106, 162, 181, 173, 268, 382/203, 209, 219, 224, 232, 254, 274,
(Continued)

(56) References Cited

U.S. PATENT DOCUMENTS 8,384,770 B2 * 2/2013 Konno ................. H04N 13/239
 348/51
8,483,424 B2 * 7/2013 Kotake ..................... G06T 7/75
 382/100

(Continued)

FOREIGN PATENT DOCUMENTS

CN 1841272 A 10/2006
CN 101093581 A 12/2007
(Continued)

OTHER PUBLICATIONS

Office Action for CN Patent Application No. 201210100149.8, dated Dec. 2, 2016, 26 pages of Office Action and 16 pages of English Translation.
(Continued)

*Primary Examiner* — Seyed H Azarian
(74) *Attorney, Agent, or Firm* — Chip Law Group

(57) ABSTRACT

Aspects of the present invention include an apparatus comprising a recognition unit configured to recognize real object in an image. The apparatus may further comprise a determining unit configured to determine a stability indicator indicating a stability of the recognition, and a display control unit configured to modify a display of a virtual object according to the stability indicator.

11 Claims, 12 Drawing Sheets

Related U.S. Application Data continuation of application No. 15/015,926, filed on Feb. 4, 2016, now Pat. No. 9,582,938, which is a continuation of application No. 14/008,789, filed as application No. PCT/JP2012/002269 on Apr. 2, 2012, now Pat. No. 9,269,002.

(51) Int. Cl.

| | | |
|---|---|---|
| *G06T 19/00* | (2011.01) | |
| *G06T 11/00* | (2006.01) | |
| *G06K 9/46* | (2006.01) | |
| *G06T 7/73* | (2017.01) | |
| *G06T 7/20* | (2017.01) | |
| *H04N 5/232* | (2006.01) | |

(52) U.S. Cl.
CPC ............ *G06K 9/4671* (2013.01); *G06T 7/20* (2013.01); *G06T 7/75* (2017.01); *G06T 11/00* (2013.01); *H04N 5/23293* (2013.01)

(58) Field of Classification Search
USPC .... 382/276, 286–295, 312, 321; 348/51, 47, 348/129; 345/427
See application file for complete search history.

(56) References Cited

U.S. PATENT DOCUMENTS

| | | | |
|---|---|---|---|
| 2002/0191862 A1 | 12/2002 | Neumann et al. | |
| 2004/0080467 A1 | 4/2004 | Chinthammit et al. | |
| 2006/0050642 A1 | 3/2006 | Chini et al. | |
| 2009/0262113 A1* | 10/2009 | Kotake | G02B 27/017 345/427 |
| 2010/0142826 A1 | 6/2010 | Kotake et al. | |
| 2013/0201293 A1* | 8/2013 | Konno | H04N 13/239 348/47 |
| 2013/0236062 A1* | 9/2013 | Kotake | G06T 7/75 382/103 |

FOREIGN PATENT DOCUMENTS

| | | |
|---|---|---|
| JP | 2009-289035 A | 12/2009 |
| JP | 2010-134649 A | 6/2010 |
| JP | 2010-231459 A | 10/2010 |
| TW | 200843989 A | 11/2008 |
| WO | 02/05245 A2 | 1/2002 |

OTHER PUBLICATIONS

Office Action for CN Patent Application No. 201210100149.8, dated Apr. 25, 2016, 28 pages of Office Action and 17 pages of English translation.

Extended European Search Report of EP Patent Application No. 12767610.4, dated Dec. 14, 2015, 08 pages.

Extended European Search Report of EP Patent Application No. 12767610.4, dated Jul. 27, 2017, 04 pages.

Non Final Office Action for U.S. Appl. No. 15/378,444, dated Apr. 20, 2017, 14 pages.

Notice of Allowance for U.S. Appl. No. 15/378,444, dated Aug. 3, 2017, 08 pages.

Non Final Office Action for U.S. Appl. No. 15/015,926, dated Jun. 2, 2016, 15 pages.

Notice of Allowance for U.S. Appl. No. 15/015,926, dated Sep. 16, 2016, 12 pages.

Corrected Notice of Allowability for U.S. Appl. No. 15/015,926, dated Jan. 5, 2017, 09 pages.

Non Final Office Action for U.S. Appl. No. 14/008,789, dated Jun. 11, 2015, 13 pages.

Notice of Allowance for U.S. Appl. No. 14/008,789, dated Sep. 24, 2015, 12 pages.

International Search Report and Written Opinion of PCT Application No. PCT/JP2012/002269, dated Apr. 24, 2012, 05 pages of ISRWO.

International Preliminary Report on Patentability of PCT Application No. PCT/JP2012/002269, dated Oct. 17, 2013, 05 pages of ISRWO.

\* cited by examiner

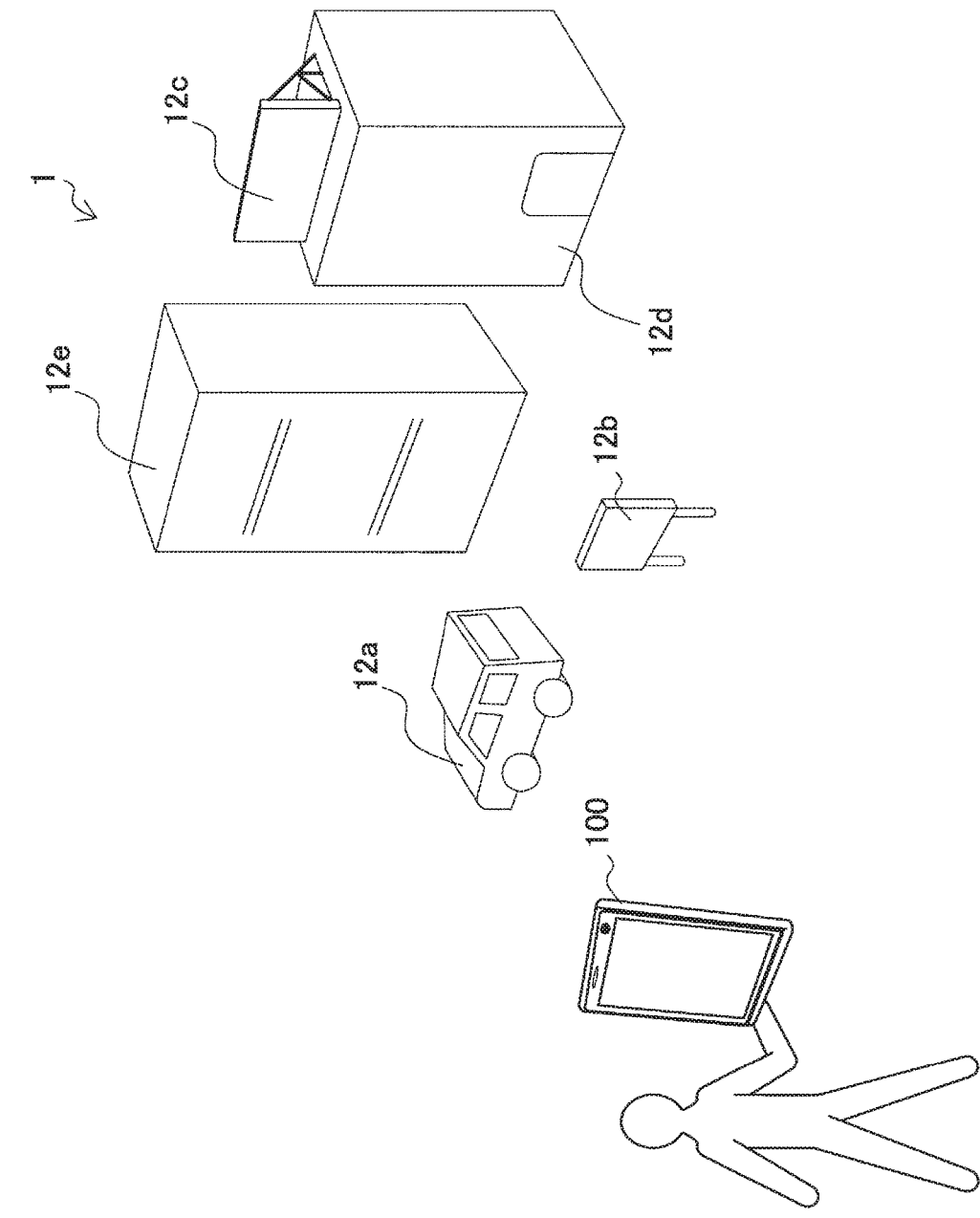

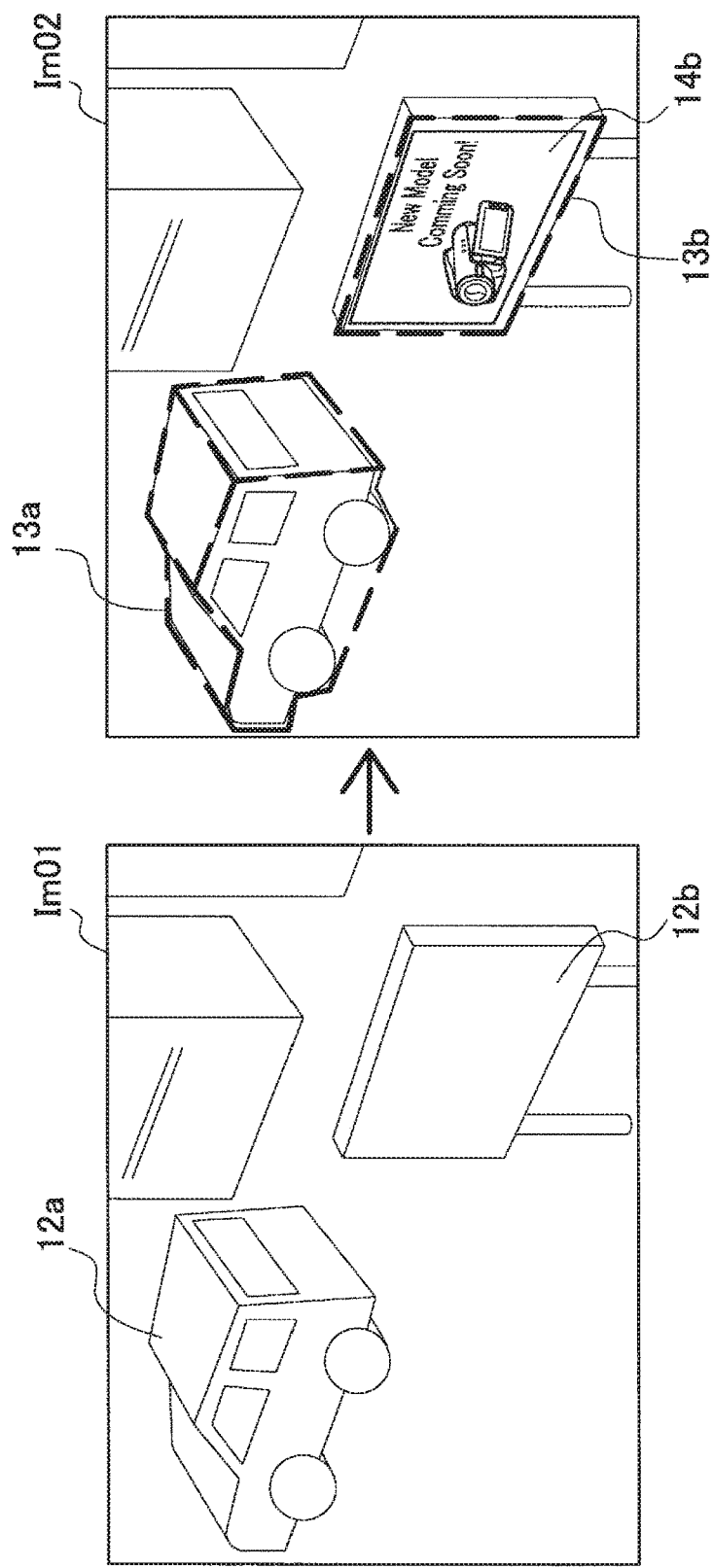
[Fig. 2]

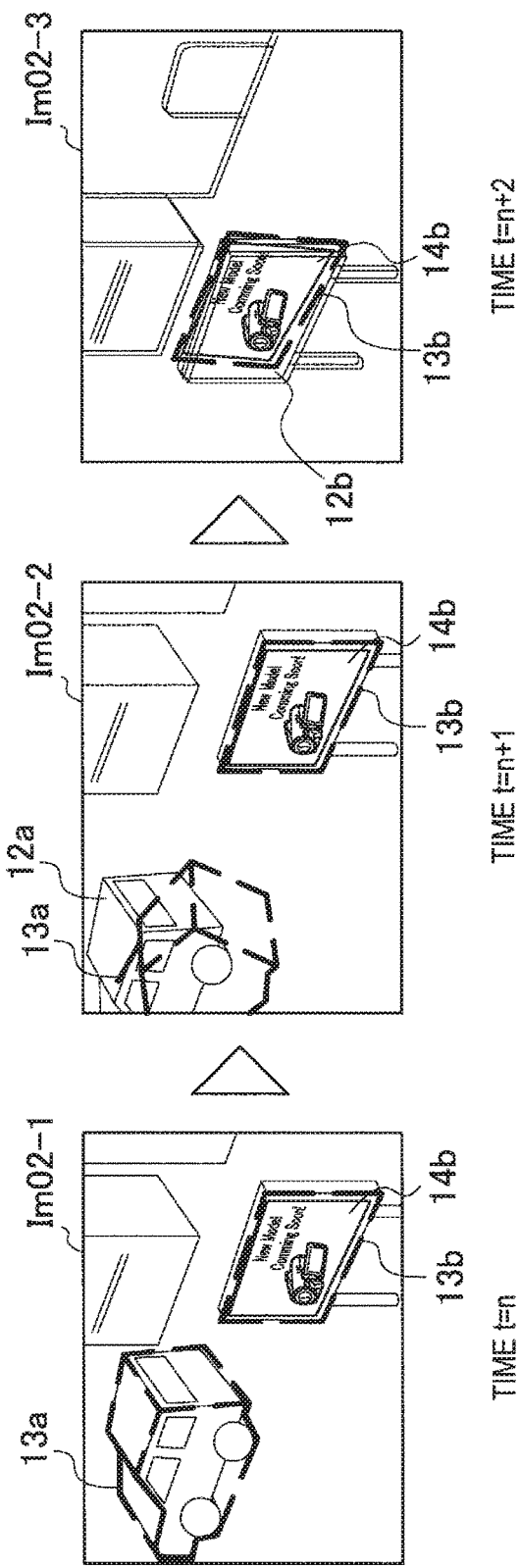

[Fig. 4]
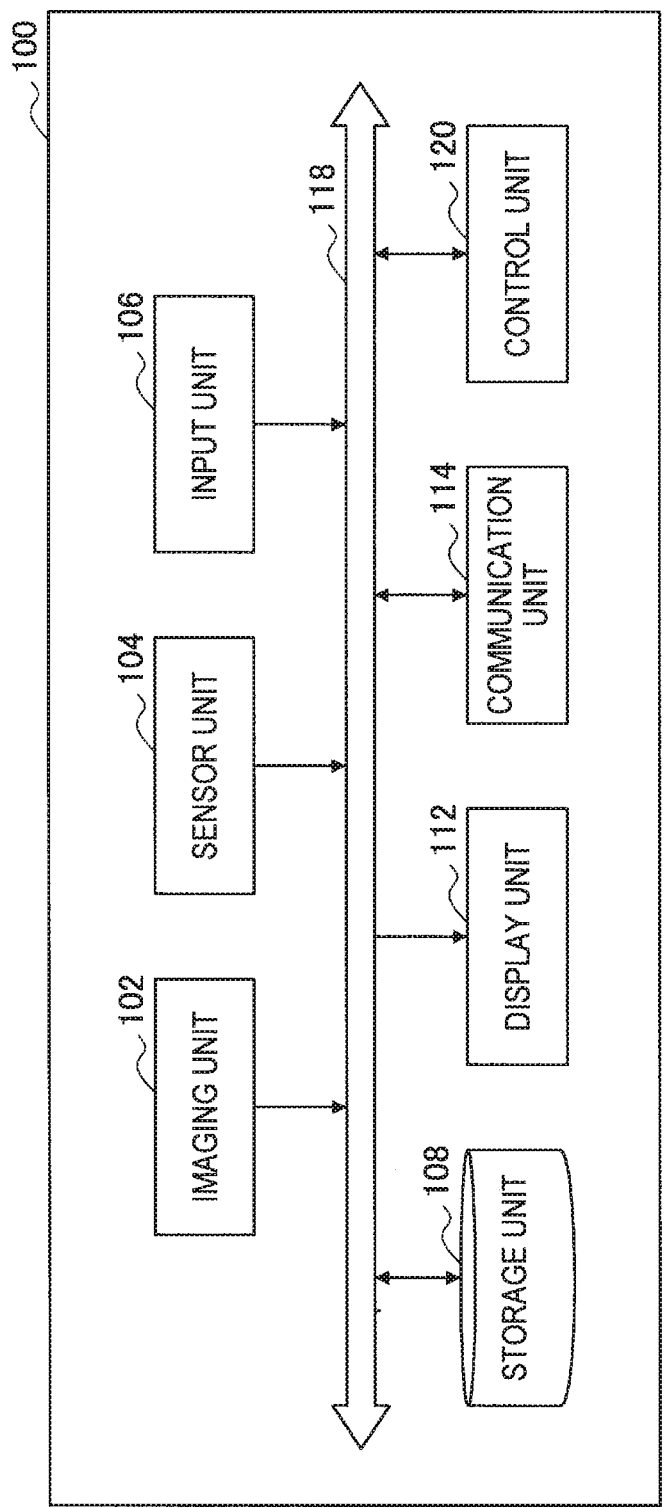

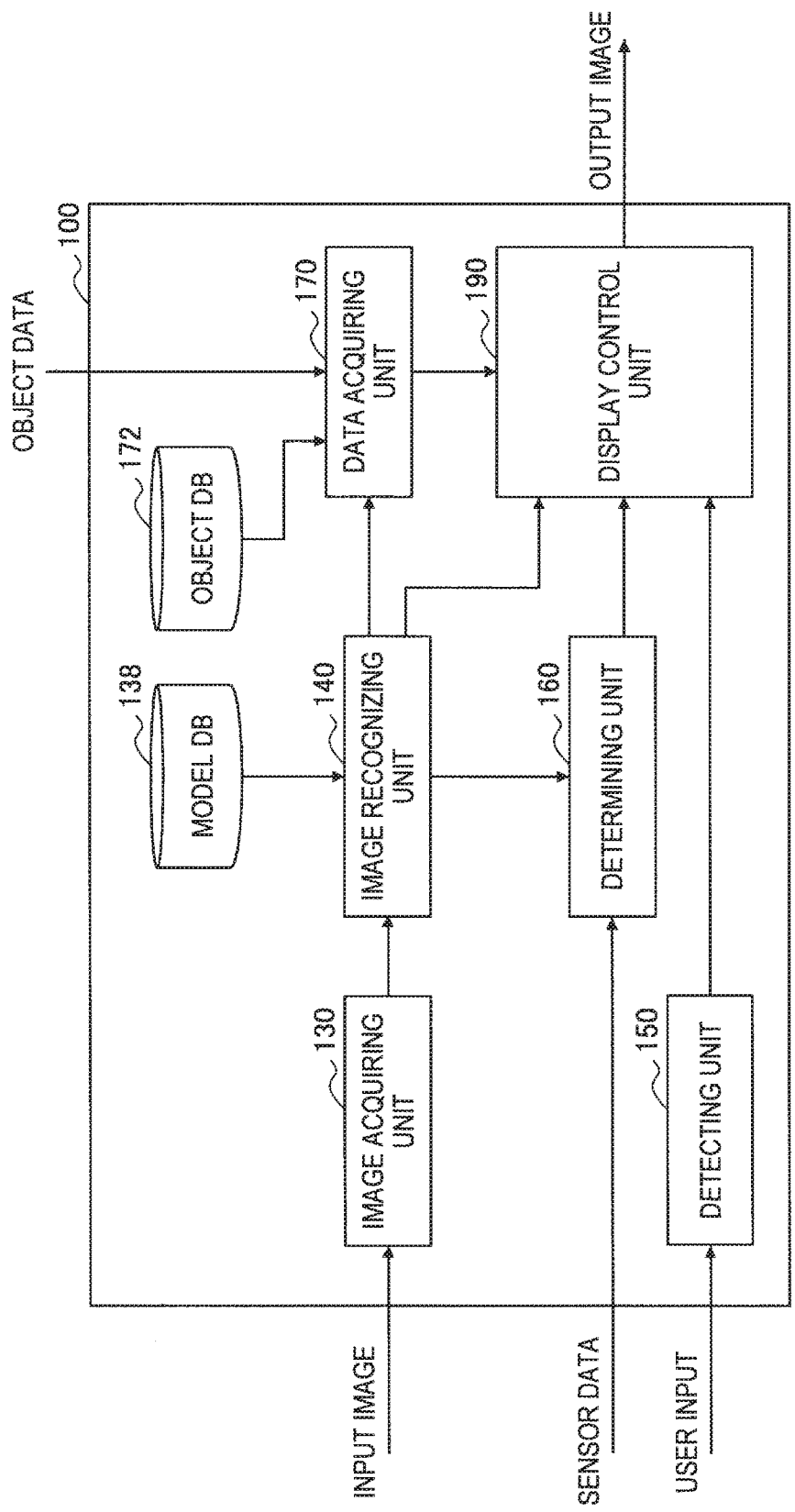

[Fig. 6]
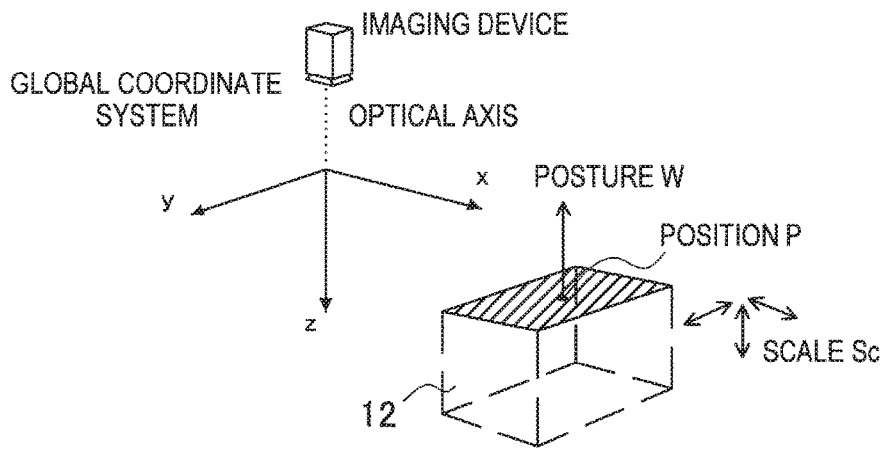
[Fig. 7]
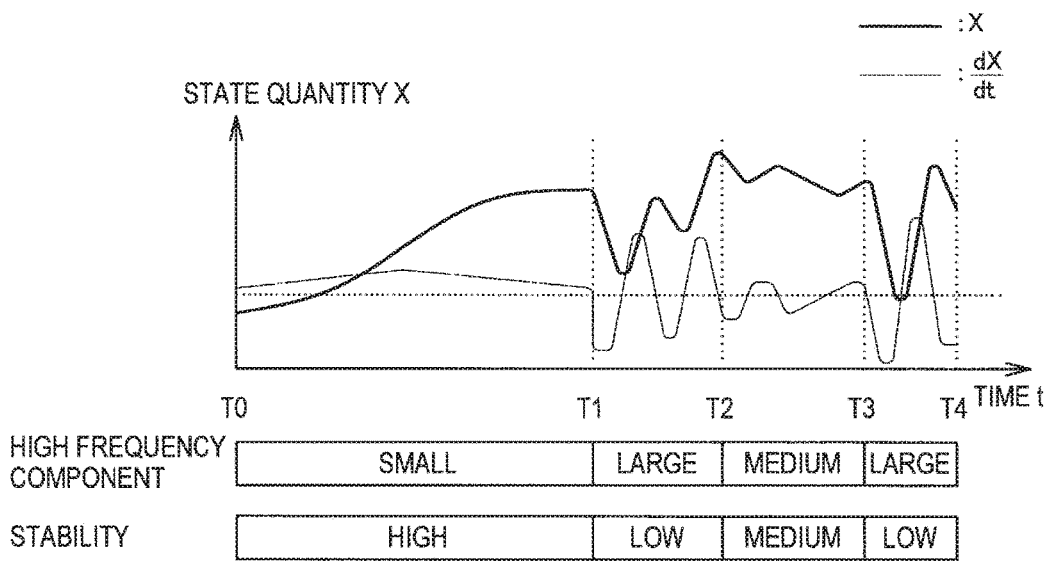
[Fig. 8]
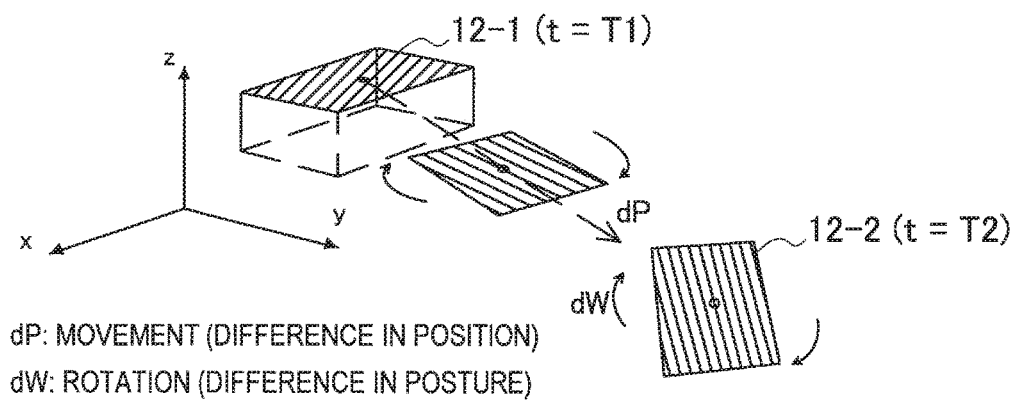
dP: MOVEMENT (DIFFERENCE IN POSITION)
dW: ROTATION (DIFFERENCE IN POSTURE)

[Fig. 9]
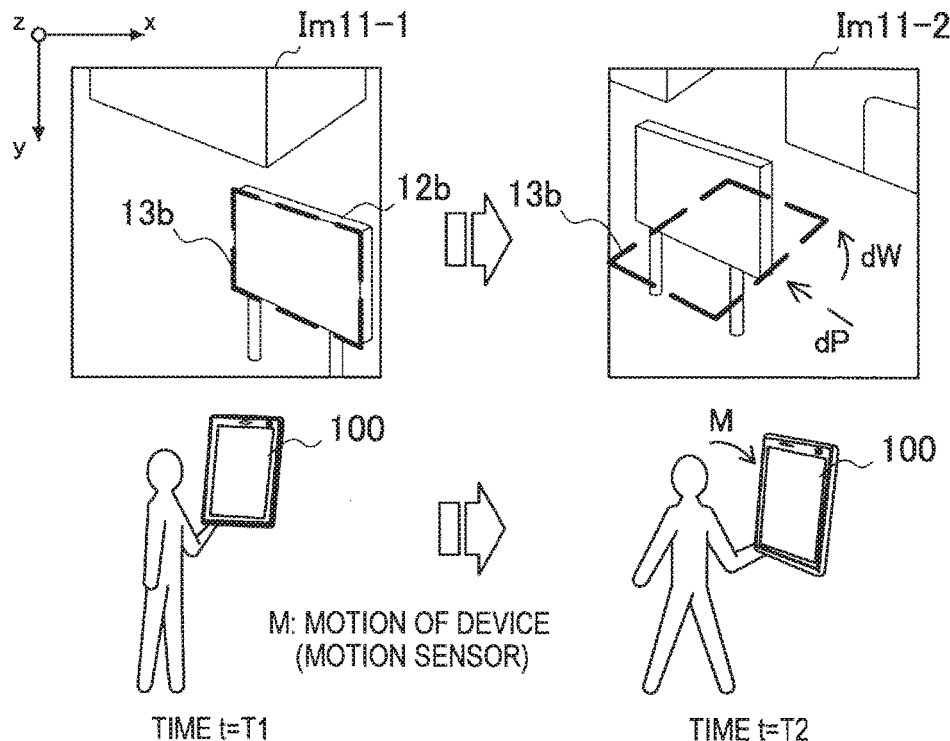
[Fig. 10]
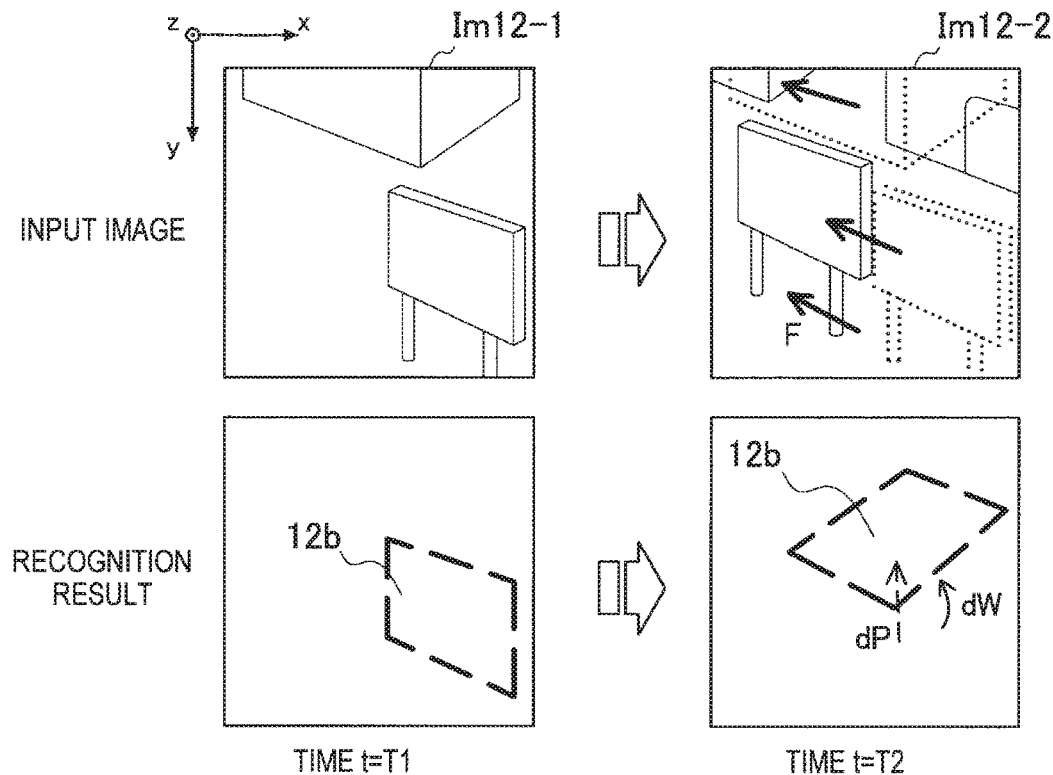

[Fig. 11]
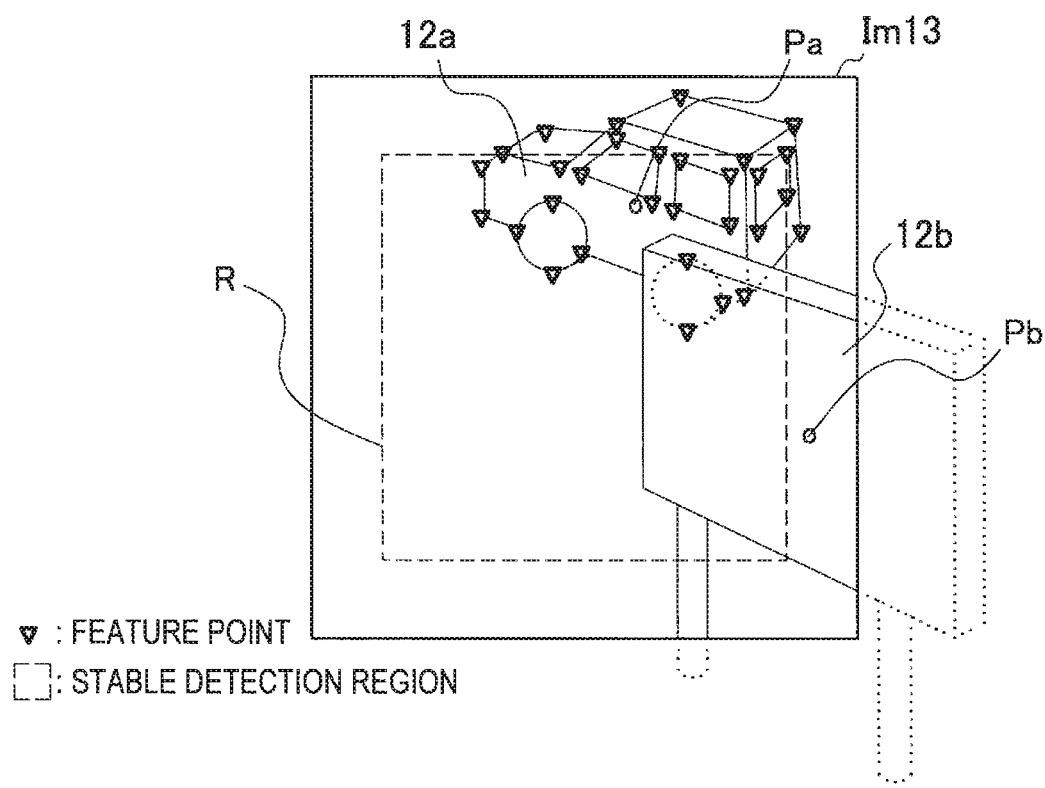

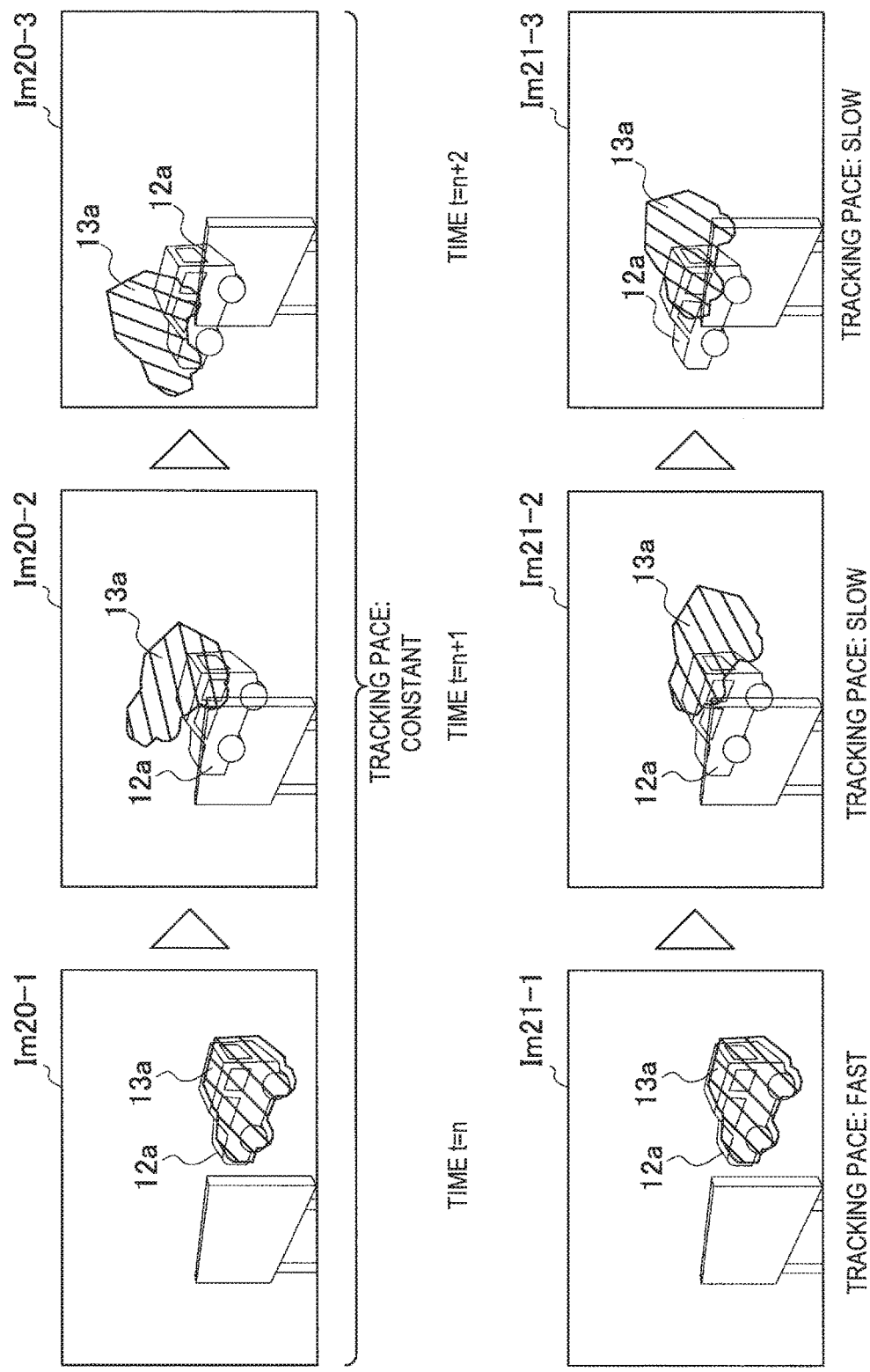
[Fig. 12]

[Fig. 13]
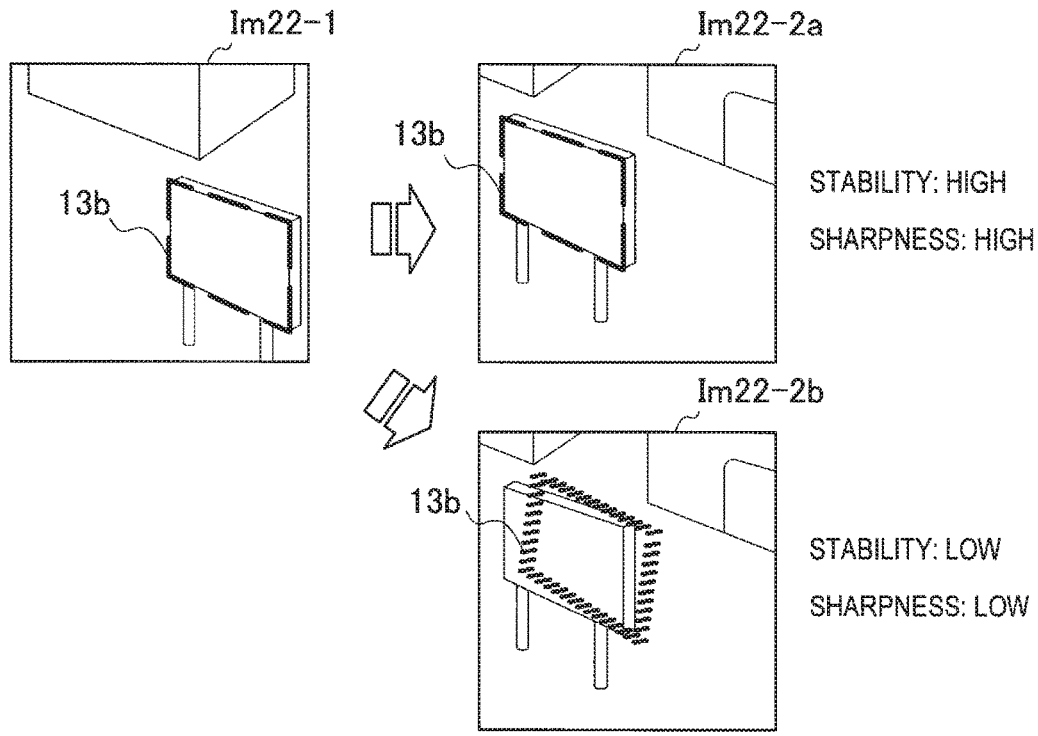
[Fig. 14]
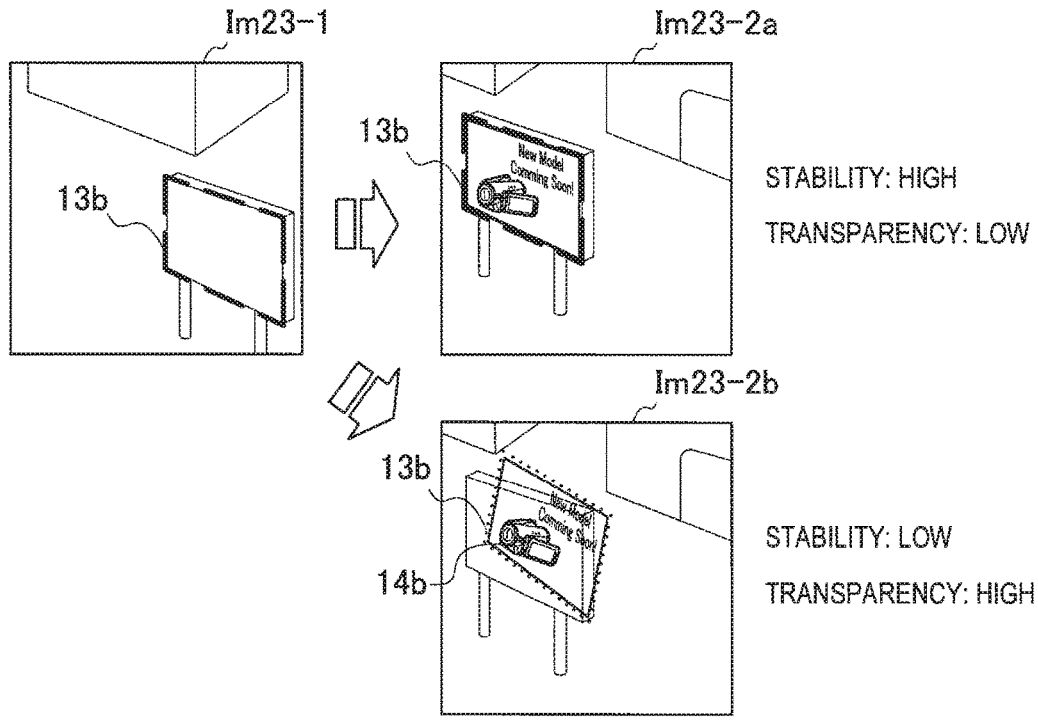

[Fig. 15]
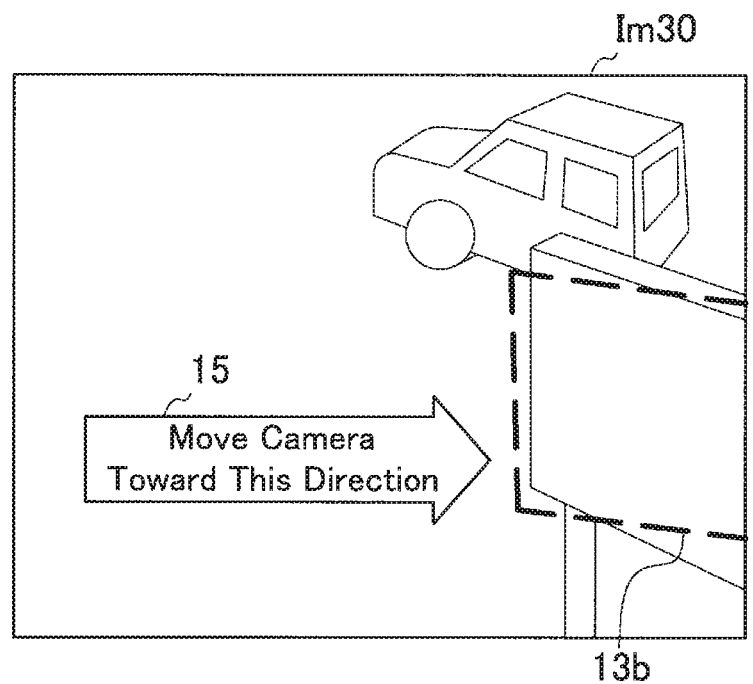

[Fig. 16]
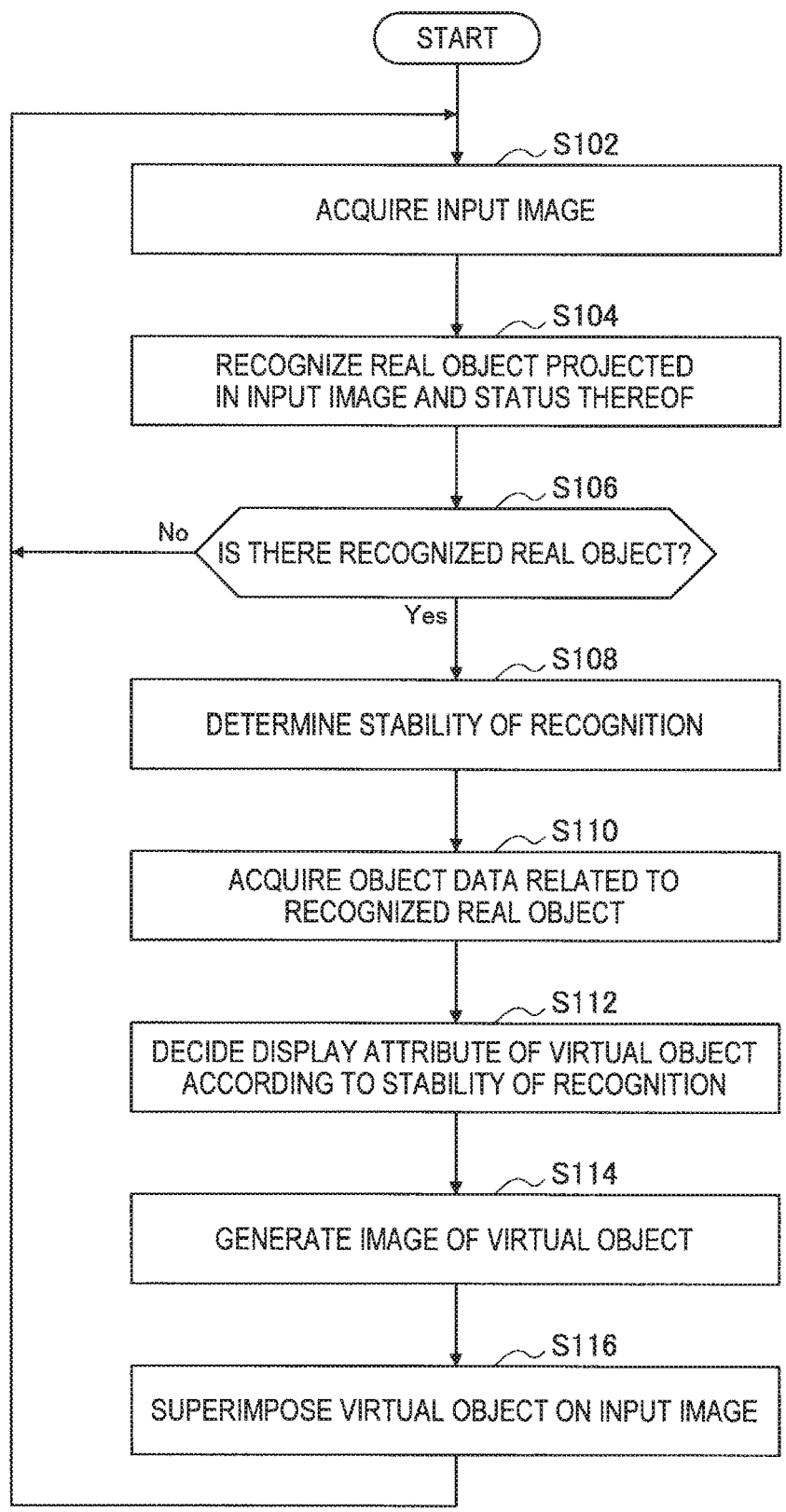

IMAGE PROCESSING APPARATUS AND DISPLAY CONTROL METHOD

CROSS REFERENCE TO RELATED APPLICATION

The present application is a continuation application of U.S. patent application Ser. No. 15/378,444 filed Dec. 14, 2016, which is a continuation application of U.S. patent application Ser. No. 15/015,926, filed Feb. 4, 2016, which is a continuation of U.S. patent application Ser. No. 14/008,789, filed Sep. 30, 2013, which is a National Stage of PCT/JP2012/002269, filed Apr. 2, 2012, and claims the priority from prior Japanese Priority Patent Application JP 2011-086684 filed in the Japan Patent Office on Apr. 8, 2011, the entire content of which is hereby incorporated by reference.

TECHNICAL FIELD

The present disclosure relates to an image processing apparatus, a display control method, and a program.

BACKGROUND ART

In recent years, a technique called augmented reality (AR), which presents a user with additional information on the real world in a superimposed manner, has been attracting attention. In the AR technique, presentations of information to the user are sometimes called "annotations," and can be visualized using virtual objects of various forms such as text, icons, or animations. In general AR applications, a virtual object is arranged to be aligned to a position of a real object (e.g., an object present in the real world which may be, for example, recognized in an image of the real world). Further, there are applications capable of arranging virtual objects in an AR space to be aligned to the posture of the real object as well as the position of the real object. For example, Patent Literature 1 ("PTL 1") has proposed a technique capable of suppressing degradation in accuracy of position alignment of a virtual object.

CITATION LIST

Patent Literature

[PTL 1] JP2010-134649

SUMMARY

Technical Problem

However, it is difficult to consistently recognize the position or the posture of a real object in the real word projected in an image accurately. That is, when an attempt to match the position or the posture of the virtual object with the real object of the real world is made, the virtual object may be possibly unsteadily displayed due to a temporal degradation in accuracy of recognition. Particularly, when unstable recognition is made, it is desirable to appropriately control the display of the virtual object and to thereby prevent the user from being confused due to the unsteady display of the virtual object.

Solution to Problem

As described above, according to the present disclosure, a user can be prevented from being confused due to the unsteady display of a virtual object. Disclosed embodiments include an apparatus comprising a recognition unit configured to recognize real object in an image. The apparatus may further comprise a determining unit configured to determine a stability indicator indicating a stability of the recognition, and a display control unit configured to modify a display of a virtual object according to the stability indicator.

Disclosed embodiments further include a method comprising recognizing real object in an image. The method may further comprise determining a stability indicator indicating a stability of the recognition, and modifying a display of a virtual object, according to the stability indicator.

Disclosed embodiments further include a tangibly embodied non-transitory computer-readable medium storing instructions which, when executed by a processor, perform a method comprising recognizing real object in an image. The method may further comprise determining a stability indicator indicating a stability of the recognition, and modifying a display of a virtual object, according to the stability indicator.

BRIEF DESCRIPTION OF DRAWINGS

FIG. 1 is a diagram for explaining an overview of an image processing apparatus according to an embodiment;

FIG. 2 is a diagram for explaining an arrangement of a virtual object.

FIG. 3 is a diagram for explaining a problem related to an arrangement of a virtual object;

FIG. 4 is a block diagram illustrating an example of a hardware configuration of an image processing apparatus according to an embodiment;

FIG. 5 is a block diagram illustrating an example of a configuration of logical functions of an image processing apparatus according to an embodiment;

FIG. 6 is a diagram for explaining a state quantity of a recognized real object in an embodiment;

FIG. 7 is a diagram for explaining a first example of a determination technique for determining stability of recognition;

FIG. 8 is a diagram for explaining a second example of a determination technique for determining stability of recognition;

FIG. 9 is a diagram for explaining a third example of a determination technique for determining stability of recognition;

FIG. 10 is a diagram for explaining a fourth example of a determination technique for determining stability of recognition.

FIG. 11 is a diagram for explaining a fifth example of a determination technique for determining stability of recognition;

FIG. 12 is a diagram for explaining an example of control of a tracking pace of a virtual object for tracking a real object;

FIG. 13 is a diagram for explaining control of sharpness of a virtual object;

FIG. 14 is a diagram for explaining control of transparency of a virtual object;

FIG. 15 is a diagram for explaining an example of a display prompting a user to take an action for increasing stability; and FIG. 16 is a flowchart illustrating an example of the flow of a display control process according to an embodiment.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A description will be made in the following order.
1. Overview
2. Hardware Configuration Example of Image Processing Apparatus According to Embodiment
3. Functional Configuration Example of Image Processing Apparatus According to Embodiment
3-1. Image Acquiring Unit
3-2. Image Recognizing Unit
3-3. Detecting Unit
3-4. Determining Unit
3-5. Data Acquiring Unit
3-6. Display Control Unit
4. Flow of Display Control Process According to Embodiment
5. Summary
1. Overview FIG. 1 is a diagram for explaining an overview of an embodiment of a technique disclosed in this disclosure. Referring to FIG. 1, an image processing apparatus 100 which a user carries in a real space 1 is shown.

The image processing apparatus 100 is an apparatus that provides the user with an AR application. For example, the image processing apparatus 100 may be, for example, a terminal apparatus such as a smartphone, a personal digital assistant (PDA), a game machine, or a portable music player or may be an information processing apparatus such as a personal computer (PC) or a workstation.

The real space 1 is an example of a space where an AR application can be used. Real objects 12a, 12b, 12c, 12d, and 12e are present in the real space 1. It is to be understood that real space 1 and real objects 12a, 12b, 12c, 12d, and 12e are merely exemplary. Although each is endowed with forms and features for the purposes of illustration, such features are arbitrary and not meant to be limiting. The real object 12a is a vehicle. The real object 12b is a guide plate. The real object 12c is an advertising signboard. The real objects 12d and 12e are buildings. The image processing apparatus 100 acquires an image obtained by imaging a real space where various real objects can be present as an input image. Then, the image processing apparatus 100 superimposes virtual objects for AR on the input image based on a recognition result of the real objects projected in the input image. Information presented to the user through the virtual objects may be arbitrary information such as navigation information, advertising information, store information, news, or weather forecast information. In the present embodiment, the AR application provided by the image processing apparatus 100 arranges a virtual object related to a real object in a real space in an image according to the position or the posture of the real object.

FIG. 2 is a diagram for explaining an arrangement of a virtual object. An image Im01 shown on the left of FIG. 2 is an example of the input image acquired by the image processing apparatus 100. The real objects 12a and 12b are projected in the input image Im01. An output image Im02 generated such that virtual objects are superimposed on the input image Im01 is shown on the right of FIG. 2. In the output image Im02, a virtual object 13a is superimposed on the real object 12a, and virtual objects 13b and 14b are superimposed on the real object 12b. The virtual objects 13a and 13b function as indications (indicators) representing a result of recognizing a real object through the image processing apparatus 100. Meanwhile, the virtual object 14b functions as information content representing information (advertising information of a product in the example of FIG. 2) related to the real object 12b. In the present disclosure, the virtual object may include both the indication and the information content. Alternatively, the virtual object may include one of the indication or the information content.

In the example of FIG. 2, the virtual object 13a is arranged according to a status of the real object 12a. The virtual objects 13b and 14b are arranged according to a status of the real object 12b. How accurately the virtual object is arranged depends on the accuracy of recognizing the status of the real object projected in the image.

FIG. 3 is a diagram for explaining a problem related to an arrangement of a virtual object. Referring to FIG. 3, output images Im02-1, Im02-2, Im02-3 of the AR application, which can be displayed by an existing technique, at points in time of a time t=n, a time t=n+1, and a time t=n+2, respectively, are shown. In the output image Im02-1 at the time t=n, an arrangement of the virtual object 13a matches a status of the real object 12a. Similarly, arrangements of the virtual objects 13b and 14b may match a status of the real object 12b. However, in the output image Im02-2 at the time t=n+1, an arrangement of the virtual object 13a has deviated from a status of the real object 12a. Further, in the output image Im02-3 at the time t=n+2, arrangements of virtual objects 13b and 14b are deviated from a status of the real object 12b. Such deviation may be caused, for example, by the degradation in the accuracy of recognizing the status of the real object. For example, the degradation in the recognition accuracy may be suddenly caused by various events such as a partial deficit of a real object in an input image, blurring of an image, the presence of a plurality of objects having a similar external appearance, or a variation in a lighting condition. Unless an environment is particularly prepared, it may be difficult to completely exclude causes causing the degradation in the recognition accuracy.

A sudden deviation in the arrangement of the virtual object illustrated in FIG. 3 may not only provide the user with an uncomfortable feeling but may also bring an undesired result such as the degradation in visibility of information represented by the virtual object or a bad impression of an advertising target product. For example, there is a technique of suppressing an abrupt change in the position or the posture of a virtual object by applying a low pass filter or a moving average filter. However, when the filters are applied, tracking of a virtual object tracking a recognized real object may be delayed. In this regard, the image processing apparatus 100 according to the present embodiment, which will be described in detail in the next section, determines how stable the recognition accuracy is, and controls a display of a virtual object based on the determination result.

2. Hardware Configuration Example of Image Processing Apparatus According to Embodiment 2-1. Hardware Configuration FIG. 4 is a block diagram illustrating an example of a hardware configuration of the image processing apparatus 100 according to the present embodiment. Referring to FIG. 4, the image processing apparatus 100 includes an imaging unit 102, a sensor unit 104, an input unit 106, a storage unit 108, a display unit 112, a communication unit 114, a bus 118, and a control unit 120.

Imaging Unit

The imaging unit 102 may include a camera module for imaging an image. The imaging unit 102 may image a real space using an imaging device such as a charge coupled device (CCD) or a complementary metal oxide semiconductor (CMOS), and generates an imaged image. The imaged image generated by the imaging unit 102 may configure each frame of a video input.

Sensor Unit

The sensor unit 104 may include a group of motion sensors that measure a motion of the imaging unit 102. Examples of the motion sensor includes an acceleration sensor that measures an acceleration of the imaging unit 102, a gyro sensor that measures a gradient angle, and a geomagnetic sensor that measures a direction toward which the imaging unit 102 is directed. Further, the sensor unit 104 may include a global positioning system (GPS) sensor that receives a GPS signal and measures the latitude, the longitude, and the altitude of an apparatus.

Input Unit

The input unit 106 is an input device that allows the user to operate the image processing apparatus 100 or to input information to the image processing apparatus 100. The input unit 106 typically includes a touch sensor that detects a touch which the user makes on a screen of the display unit 112. Instead of (or in addition to) the touch sensor, the input unit 106 may include a pointing device such as a mouse or a touch pad, a gesture recognizing module that recognizes a user's gesture projected in an image, or a line-of-sight detecting module that includes a head mounted display (HMD) and detects a direction of a user's line of sight. In addition, the input unit 106 may include any other kind of input device such as a keyboard, a keypad, a button, or a switch.

Storage Unit

The storage unit 108 is configured with a storage medium such as a semiconductor memory or a hard disk, and stores a program and data used for performing processing by the image processing apparatus 100. Examples of data stored in the storage unit 108 include image data generated by the imaging unit 102 and sensor data generated by the sensor unit 104. In addition, for example, model data used when the image processing apparatus 100 recognizes a real object and object data for defining a virtual object may be included as data stored in the storage unit 108.

Display Unit

The display unit 112 may include a display module configured with a liquid crystal display (LCD), an organic light-emitting diode (OLED), a cathode ray tube (CRT), or the like. For example, the display unit 112 displays an image imaged by the imaging unit 102 or an image of an AR application realized by the control unit 120 on a screen. The display unit 112 may be a screen of the image processing apparatus 100 gripped by the user or an HMD of a through type or a non-through type mounted by the user.

Communication Unit

The communication unit 114 may include a communication interface that mediates communication between the image processing apparatus 100 and another apparatus. The communication unit 114 may support an arbitrary wireless communication protocol or an arbitrary wire-line communication protocol, and establishes a communication connection with another apparatus.

Bus

The bus 118 connects the imaging unit 102, the sensor unit 104, the input unit 106, the storage unit 108, the display unit 112, the communication unit 114, and the control unit 120 to one another.

Control Unit

The control unit 120 may include a processor such as a central processing unit (CPU) or a digital signal processor (DSP). The control unit 120 implements various functions of the image processing apparatus 100, which will be described later, by executing a program stored in the storage unit 108 or another storage medium. In particular, the control unit 120 may include or be connected to a display control unit for, among other things, controlling display unit 112.

3. Functional Configuration Example of Image Processing Apparatus According to Embodiment FIG. 5 is a block diagram illustrating an example of a configuration of logical functions implemented by the storage unit 108 and the control unit 120 of the image processing apparatus 100 illustrated in FIG. 4. Referring to FIG. 5, the image processing apparatus 100 includes an image acquiring unit 130, a model database (DB) 138, an image recognizing unit 140, a detecting unit 150, a determining unit 160, a data acquiring unit 170, an object DB 172, and a display control unit 190.

3-1. Image Acquiring Unit

The image acquiring unit 130 acquires an image obtained by capturing a real space as an input image. For example, the image acquiring unit 130 may sequentially acquire each frame of a video input from the imaging unit 102 as the input image. The image acquiring unit 130 may acquire each frame of a video input, which has been imaged in the past, stored in the storage unit 108 as the input image. The image acquiring unit 130 outputs the acquired input image to the image recognizing unit 140.

3-2. Image Recognizing Unit

The image recognizing unit 140 (or "recognizing unit") may recognize a real object using data stored in the model DB 138. In the model DB 138, model data related to shapes or external appearances of real objects which the image processing apparatus 100 regards as recognition targets is accumulated in advance. In the present embodiment, the target recognized by the image processing apparatus 100 may be an arbitrary object present in a real space such as the real objects 12a to 12e illustrated in FIG. 1. Examples of the model data include data defining the shape of each real object, image data such as a predetermined symbol mark or a text label attached to each real object, and data of a feature quantity set extracted from a known image of each real object.

The image recognizing unit 140 may recognize a real object projected in the input image input from the image acquiring unit 130 and recognizes a status of the real object projected in the input image. A status of the real object recognized by the image recognizing unit 140 may include at least one of the position and the posture of the real object. In the present embodiment, the image recognizing unit 140 recognizes the position, the posture, and the scale of the real object in the image. For example, the image recognizing unit 140 may collate a set of feature points extracted from the input image with the shape of the real object which can be defined by the model data. The image recognizing unit 140 may collate the image data such as the symbol mark or the text label which can be defined by the model data with the input image. In addition, the image recognizing unit 140 may collate a known feature quantity of an image of the real object which can be defined by the model data with the feature quantity extracted from the input image. Even in any of the above cases, the image recognizing unit 140 can recognize that a real object whose collation score is higher than a predetermined threshold value is being projected in the input image at the position, the posture, and the scale corresponding to the collation score.

FIG. 6 is a diagram for explaining a state quantity of a real object recognized by the image recognizing unit 140 in the present embodiment. Referring to FIG. 6, a global coordinate system formed by an x axis and a y axis on a plane vertical to an optical axis direction of an imaging apparatus that has imaged the input image and a z axis parallel to the optical axis direction is shown. A position P of a real object 12 recognized by the image recognizing unit 140 is given as position coordinates of a reference point of the real object in the global coordinate system. A posture W of the real object 12 is given as a rotational angle of each axis periphery. A scale Sc of the real object 12 is given as a magnification for each axis direction. In the present disclosure, for simplicity of description, the position P, the posture W, and the scale Sc of each real object are described as discrete variables (state quantities). However, the position P, the posture W, and the scale Sc of each real object may be expressed, in an integrated manner, by, for example, one 4 by 4 homogeneous transformation matrix representing transformation between the global coordinate system and a model coordinate system of each real object. In this case, each state quantity (that is, each of the position P, the posture W, and the scale Sc) is extracted from one homogeneous transformation matrix as necessary, and then used. The global coordinate system may be a coordinate system representing relative coordinates using the position of the imaging apparatus as an original point. Alternatively, the global coordinate system may be a coordinate system representing absolute coordinates fixedly defined in a real space. The image recognizing unit 140 outputs an identifier, the position P, the posture W, and the scale Sc of each real object projected in the input image to the determining unit 160, the data acquiring unit 170 and the display control unit 190.

3-3. Detecting Unit

The detecting unit 150 detects a user input, and outputs the user input to the display control unit 190. Examples of the user input detected by the detecting unit 150 include a touch input to a touch sensor of the input unit 106, pressing of a button, a motion of an apparatus measured by a sensor group of the sensor unit 104 (for example, a gradient, shaking, or the like), a user's gesture, and a user's voice.

3-4. Determining Unit

The determining unit 160 may determine stability of recognition which the image recognizing unit 140 makes on the status of the real object projected in the input image. The stability determined by the determining unit 160 may be represented by a continuous value or a discrete value (for example, a stepwise value having three or more steps or two values of "high" and "low"). Five examples of a method of determining stability by the determining unit 160 will be described below with reference to FIGS. 7 and 11.

(1) First Example

For example, when recognition made by the image recognizing unit 140 is unstable, a change in the state quantity of the real object is likely to be drastic. Thus, the determining unit 160 may determine the stability based on a temporal change in the state quantity of the real object recognized by the image recognizing unit 140. For example, the temporal change in the state quantity of the real object can be detected by comparing a frequency characteristic of the state quantity of the real object, a differential (or a second order differential) of the state quantity, or a history of the state quantity within a predetermined time period with a current value of the state quantity.

FIG. 7 illustrates an example of the temporal change in a state quantity of the real object. In FIG. 7, a horizontal axis denotes a time t, and a vertical axis denotes a state quantity X and a first order differential (dX/dt) thereof. The state quantity may be any one of the position P, the posture W, and the scale Sc on a certain real object or a combination of two or more thereof.

In the example of FIG. 7, the state quantity X gently changes during a time period between a time T0 and a time T1. In this case, for example, when a frequency component of the state quantity X is extracted by the Fourier transform, a high frequency component of the state quantity X decreases. An absolute value of the first order differential of the state quantity X does not exceed a certain level (a level corresponding to a realistic limit at which the real object moves relative to the image apparatus). This is similarly applied to the second order differential of the state quantity X. Further, since the change in the state quantity X is gentle, a current value of the state quantity X does not significantly differ from a history of previous m samples of the state quantity X. The history of the state quantity X may be a simple average value of the previous m samples or a weighted average value of the previous m samples (e.g., the more recent the sample is, the larger a set weight).

On the other hand, the state quantity X drastically changes during a time period between the time T1 and a time T2. In this case, when the frequency component of the state quantity X is extracted, the high frequency component of the state quantity X further increases. Further, the first order differential of the state quantity X oscillates around zero. The absolute value of the first order differential is higher than the predetermined level. In addition, a current value of the state quantity X may significantly differ from the history of the previous m samples of the state quantity X.

Thus, in a first determination technique, the determining unit 160 evaluates a temporal change in the state quantity by comparing one of the magnitude of the high frequency component of the state quantity of the real object, an absolute value (an integrated value) of the first order differential (or the second order differential) of the state quantity, and the history of the state quantity with the current value of the state quantity. Then, the determining unit 160 determines that the more drastic the evaluated temporal change is, the lower the stability of recognition is. In the example of FIG. 7, it is determined that the stability of the time period between T0 and T1 is "high," the stability of the time period between T1 and T2 is "low," the stability of the time period between T2 and T3 is "medium," and the stability of the time period between T3 and T4 is "low."

(2) Second Example

When recognition made by the image recognizing unit 140 is unstable, a change in the state of the real object, which may occur rarely in a realistic situation, is likely to be shown in a recognition result. For example, when a real object, which remains stationary in a real space, is imaged, the position or the scale of the real object in the image may change depending on a change in an angle of view. However, in this case, it is rare for the real object to significantly rotate at the same time. In this regard, in a second determination technique, the determining unit 160 may determine the stability based on consistency between a plurality of state quantities of the real object recognized by the image recognizing unit 140.

Referring to FIG. 8, a recognition result, obtained by the image recognizing unit 140 during a time period between a time T1 and a time T2, represents that a real object 12 is moving and the posture of the real object 12 is rotating. Movement of the real object 12 during the time period between the time T1 and the time T2 may be represented by a difference dP in the position P, and rotation may be represented by a difference dW in the posture W. Thus, for example, when the movement dP is larger than a first threshold value and the rotation dW is larger than a second threshold value, since the change in the status of the real object is unnatural, the determining unit 160 can determine that the stability of recognition made by the image recognizing unit 140 is decreasing.

(3) Third Example

In a third determination technique, the determining unit 160 determines the stability based on consistency between the change in the state quantity of the real object and a motion of the imaging unit 102 measured by a motion sensor.

Referring to FIG. 9, the user is moving the image processing apparatus 100 so that an angle of view of the imaging unit 102 can change during a time period between a time T1 and a time T2. As a result, the real object 12b projected on the lower right of an input image Im11-1 is being moved to the upper left of an input image Im11-2. A change in an angle of view of the imaging unit 102 can be recognized based on sensor data from a motion sensor (for example, an acceleration sensor, a gyro sensor, or a geomagnetic sensor) of the sensor unit 104. In this case, when the movement dP or the rotation dW of the real object 12b is not consistent with a motion of the image processing apparatus 100 recognized based on the sensor data, the determining unit 160 can determine that the stability of recognition made by the image recognizing unit 140 is decreasing.

(4) Fourth Example

In a fourth determination technique, the determining unit 160 determines the stability based on consistency between a change in a state quantity of a real object recognized by the image recognizing unit 140 and a direction of a motion of a real space shown in a plurality of input images. For example, a direction of a motion of a real space shown in a plurality of input images may be recognized based on an optical flow obtained from a plurality of input images.

Referring to FIG. 10, an optical flow F from an input image Im12-1 imaged at a time T1 to an input image Im12-2 imaged at a time T2 is shown. The optical flow F represents a motion of a real object which is moved toward the upper left of the image. On the other hand, a recognition result obtained by the image recognizing unit 140 represents that the real object 12b is rotating while moving upward. As described above, when the movement dP or the rotation dW of the real object 12b is not consistent with the optical flow formed by a plurality of input images, the determining unit 160 can determine that the stability of recognition made by the image recognizing unit 140 is decreasing. Further, the stability of the real object may be calculated as the continuous value, based on a correlation (for example, a scalar product) between a motion vector of the real object predicted from the optical flow around the real object 12b and a motion vector of the real object recognized as a result of recognizing the real object (for example, the larger the scalar product is, the more stable the recognition is).

(5) Fifth Example

For example, when a part of a real object is not projected in an input image, a probability that the accuracy of recognition will decrease is high. In this regard, in a fifth determination technique, when a part of a recognized real object is not projected in an input image, the determining unit 160 determines that the stability of recognition is lower than when the whole real object is projected in the input image. For example, a part of a recognized real object may not be projected in an input image when a part of the real object is positioned outside an angle of view, or when a part of the real object is hidden by another real object (in case of so-called occlusion).

Referring to FIG. 11, the real objects 12a and 12b are projected in an input image Im13. A part of the real object 12a is hidden by the real object 12b. A part of the real object 12b is out of an angle of view. A plurality of triangular symbols illustrated in FIG. 11 represent the positions of feature points which can be used when the image recognizing unit 140 recognizes the real object 12a. For example, the determining unit 160 calculates a ratio of the number of feature points of the real object 12a recognized by the image recognizing unit 140 to the total number of feature points thereof. When the calculated ratio is lower than a predetermined threshold value, the determining unit 160 can determine that a part of the real object 12 is not projected in the input image. Further, for example, when the center of the real object is outside a stable detection region of an image, the determining unit 160 can easily determine that there is a high possibility that a part of the real object is not projected in the input image. In the example of FIG. 11, a center Pa of the real object 12a is located inside a stable detection region R, whereas a center Pb of the real object 12b is located outside the stable detection region R. The stable detection region R can be set to the center of the input image so that a boundary thereof can have a predetermined offset from the edge of the input image.

The determining unit 160 determines the stability of recognition made by the image recognizing unit 140 using the above described techniques, and outputs the stability of each real object to the display control unit 190. The image processing apparatus 100 may allow the determining unit 160 to select two or more of the above described techniques, and may adaptively change a technique to be used by the determining unit 160 according to a condition. For example, when stability is determined on a dynamic real object, the first technique may be selected, whereas when stability is determined on a stationary real object, any one of the second to fourth techniques may be selected. Further, the fifth technique may be selected in a scene in which a small processing cost is desirable.

3-5. Data Acquiring Unit

The data acquiring unit 170 acquires data related to the virtual object to be superimposed on the input image through the display control unit 190. The data acquired by the data acquiring unit 170 includes object data defining the virtual object. Examples of the object data include the type of virtual object, an identifier of an associated real object, a relative display position from the real object, and data defining the content of the information content. The data acquiring unit 170 may acquire object data which is previously stored in the object DB 172. Alternatively, the data acquiring unit 170 may acquire newest object data from a data server installed in the real space via the communication unit 114. For example, the object data provided from the data server may be data which differs according to the position of the image processing apparatus 100 measured by the sensor unit 104. The data acquiring unit 170 outputs the object data to the display control unit 190.

3-6. Display Control Unit

The display control unit 190 may control a display of the virtual object by the AR application provided by the image processing apparatus 100. More specifically, for example, the object data of the virtual object associated with the real object recognized as being projected in the input image by the image recognizing unit 140 is input from the data acquiring unit 170 to the display control unit 190. The display control unit 190 generates an object image of the virtual object based on the object data. The object image generated by the display control unit 190 is typically an image obtained by projecting the virtual object virtually arranged in a three-dimensional real space on an imaging surface of the image processing apparatus 100. Then, the display control unit 190 outputs the generated output image to the display unit 112. As a result, an image of the AR application is presented to the user.

An arrangement of a virtual object is decided according to a status of an associated real object. That is, the display control unit 190 causes the virtual object to be displayed on a display device so that the virtual object can track the position, the posture, and the scale of each real object.

In the present embodiment, the display control unit 190 changes a display of the virtual object associated with each recognized real object according to the stability of recognition made by the image recognizing unit 140. For example, the display control unit 190 changes a tracking pace of the virtual object for tracking each real object according to the stability. Typically, the display control unit 190 increases the tracking pace of the virtual object for tracking each real object when the stability is high, but decreases the tracking pace of the virtual object for tracking each real object when the stability is low. For example, the tracking pace may be represented by an interpolation coefficient k in Formula (1):

$$Z_{n+1} = Z_n + k(X_{n+1} - Z_n) \quad \text{[Math. 1]}$$

In Formula (1), $Z_n$ and $Z_{n+1}$ represent a status of a virtual object at a time t=n and a status of a virtual object at a time t=n+1, and $X_{n+1}$ represents a status of a recognized real object at a time t=n+1. The display control unit 190 controls a value of the interpolation coefficient k in a range which is larger than zero but equal to or less than 1. For example, when k is 1, $Z_{n+1} = X_{n+1}$, and a status of the virtual object at a time t=n+1 reflects a status of the recognized real object as is. However, when k is 0.1, $Z_{n+1} = 0.1 X_{n+1} + 0.9 X_n$, a status of the virtual object at a time t=n+1 partially reflects a status of the recognized real object.

FIG. 12 is a diagram for explaining an example of control of a tracking pace of a virtual object for tracking a real object. Statuses of the virtual object 13*a* at three points in time of times t=n, n+1, and n+2 when the tracking pace is constant (when the interpolation coefficient k is constant) are shown in the upper section of FIG. 12. The virtual object 13*a* is a virtual object related to the real object 12*a*. At points in time of times t=n+1 and n+2, since the stability of recognition is low, the status of the virtual object 13*a* is significantly deviated from the real object 12*a*.

Meanwhile, statuses of the virtual object 13*a* at three points in time of times t=n, n+1, and n+2 when the tracking pace is dynamically controlled are shown in the lower section of FIG. 12. In this case, at the point in time of the time n=t, since the stability is high, the tracking pace is fast, and the status of the real object 12*a* is almost consistent with the status of the virtual object 13*a*. Thereafter, at the points in time of the times t=n+1 and n+2, when the stability decreases, the value of the interpolation coefficient k decreases, and thus the status of the virtual object 13*a* gently tracks the status of the real object 12*a*. As a result, the deviation of the virtual object 13*a* from the status of the real object 12*a* is outwardly suppressed to be reduced.

The display control unit 190 may change a display attribute of the virtual object according to the stability instead of (or while) changing the tracking pace of the virtual object for tracking each real object according to the stability. The display attribute of the virtual object may include a static attribute and a dynamic attribute related to a display mode of the virtual object. Examples of the static attribute related to a display mode of the virtual object include transparency, sharpness, color, scale, shape, the number, and an afterimage pattern of the virtual object. Examples of a dynamic attribute related to a display mode of the virtual object include a blinking pattern of the virtual object, a blinking cycle, and the type of animation. By changing the display attribute of the virtual object, it is possible to cause the user to intuitively understand the fact that the stability of recognition of the real object is decreasing.

As an example, referring to FIG. 13, sharpness of the virtual object 13*b* is set to high in an input image Im22-2*a* whose stability of recognition of the real object is determined to be high. As a result, the contour of the virtual object 13*b* of the input image Im22-2*a* is clearly displayed. However, sharpness of the virtual object 13*b* is set to low in an input image Im22-2*b* whose stability of recognition of the real object is determined to be low. As a result, the contour of the virtual object 13*b* of the input image Im22-2*b* is dimly displayed.

As another example, referring to FIG. 14, transparency of the virtual object 13*b* is set to low in an input image Im23-2*a* whose stability of recognition of the real object is determined to be high. As a result, the contour of the virtual object 13*b* of the input image Im23-2*a* is not transparent. However, transparency of the virtual object 13*b* is set to high in an input image Im23-2*b* whose stability of recognition of the real object is determined to be low. As a result, the contour of the virtual object 13*b* of the input image Im23-2*b* is transparent.

In the example of FIG. 14, the transparency of the virtual object 13*b*, which functions as the indication for representing a recognition result of the real object, changes according to the stability of recognition, whereas the transparency of the virtual object 14*b*, which functions as the information content, is maintained constant. As described above, the display control unit 190 may change a display of only one of the indication and the information content. By changing a display of only the indication, when the stability of recognition of the real object has decreased, it is possible to cause the user to understand the degradation in the stability without decreasing visibility of the information content. On the other hand, by changing a display of only the information content, when the stability of recognition of the real object has decreased, it may be possible to prevent an impression of the information content from getting worse while informing the user of how the real object has been recognized.

When the stability of recognition made by the image recognizing unit 140 is low, the display control unit 190 may further cause information prompting the user to take an action for increasing the stability to be displayed on the display device. In this case, for example, the information to display may be a message (see a message 15 of an image Im30 of FIG. 15) prompting movement of an apparatus so that the real object shown outside an angle of view can be located within an angle of view. The user who has referred to the information takes an action for increasing the stability, and thus the unsteady display of the virtual object can be avoided.

In addition, when a predetermined user input is detected by the detecting unit 150, the display control unit 190 may cause the display device to perform a display of the virtual object under the assumption that the stability is high, regardless of the stability of recognition determined by the determining unit 160. Examples of the predetermined user input include an input to a touch sensor, an input sensed by a motion sensor, pressing down of a button provided on the image processing apparatus 100, and an arbitrary user input such as the user's gesture or voice. As a result, when the user allows the unsteady display of the virtual object, display control according to the stability can be temporarily stopped.

4. Flow of Display Control Process According to Embodiment

FIG. 16 is a flowchart illustrating an example of the flow of a display control process performed by the image processing apparatus 100 according to the present embodiment.

Referring to FIG. 16, first, the image acquiring unit 130 acquires an image projected in a real space as an input image (step S102). Next, the image recognizing unit 140 may recognize a real object projected in each input image input from the image acquiring unit 130 and recognizes a status of each real object projected in the input image (step S104). For example, the status of the recognized real object may include the position, the posture, and the scale of the real object. Next, the determining unit 160 determines whether or not there is a real object recognized as being projected in the input image by the image recognizing unit 140 (step S106). Here, when there is no recognized real object, the process returns to step S102. However, when there is a recognized real object, the process proceeds to step S108.

In step S108, the determining unit 160 may determine a stability of recognition which the image recognizing unit 140 has made on the status of the real object projected in the input image. Next, the data acquiring unit 170 acquires object data of a virtual object related to each real object recognized by the image recognizing unit 140 (step S110). Further, the display control unit 190 decides a display attribute of the virtual object related to each recognized real object according to the stability of recognition determined by the determining unit 160 (step S112). Here, the display attribute may be the interpolation coefficient k, or transparency, sharpness, a blinking pattern, a blinking cycle, or the scale of an afterimage of the virtual object. Next, the display control unit 190 generates an image of the virtual object related to each real object according to the decided display attribute (step S114). Then, the display control unit 190 superimposes the generated image of the virtual object on the input image (step S116).

5. Summary

The image processing apparatus 100 according to an embodiment has been described in detail so far with reference to FIGS. 1 to 16. According to the present embodiment, a display of the virtual object related to the real object dynamically changes according to the stability of recognition made on the status of the real object projected in the image. As a result, it is possible to prevent the user from being confused due to the unsteady display of the virtual object caused by the degradation in the accuracy of recognition.

Further, according to the present embodiment, an application, which allows the virtual object to track the position or the posture of the real object, may control the tracking pace of the virtual object for tracking the real object according to the stability, for example. As a result, a tracking delay can be kept small while the accuracy of recognition is high, and sudden deviation in an arrangement of the virtual object when the accuracy of recognition has been lowered can be effectively reduced.

Further, according to the present embodiment, a display attribute of the virtual object, such as transparency, sharpness, a blinking pattern, a blinking cycle, or the scale of an afterimage of the virtual object, can be controlled according to the stability. As a result, since the user may intuitively understand the fact that the stability of recognition of the real object is decreasing, it is possible to prevent the user from being confused when a display of the virtual object is unsteady.

Further, the stability can be determined based on the temporal change in the state quantity of the real object. In this case, the stability can be accurately determined, regardless of whether a target real object is a dynamic real object or a stationary real object, without needing an auxiliary input by a motion sensor or the like. Further, the stability may be determined based on consistency between the recognized state quantities, consistency between the state quantity and a motion of an apparatus, or consistency between the state quantity and a direction of a motion of a real space shown in the input image. In this case, the stability can be determined without needing a calculation such as analysis or a differential of a frequency of the state quantity of the real object. Further, the stability can be easily determined according to whether or not the real object has a part which is not projected in the input image.

The processing by the image processing apparatus 100 described in the present disclosure may be implemented using software, hardware, or a combination of software and hardware. For example, a program configuring software is previously stored in a storage medium provided inside or outside each apparatus. For example, each program is read to a random access memory (RAM) at the time of execution and executed by a processor such as a CPU.

The present embodiment has been described in connection with the example in which an image is mainly displayed on a screen of the display unit 112 of the image processing apparatus 100. However, as another embodiment, an image processing apparatus that receives an input image from a terminal apparatus carried by a user may recognize the position or the posture of a real object projected in the input image and control a display of a virtual object related to the real object according to a stability of recognition. In this case, an image for displaying the virtual object may be transmitted from the image processing apparatus to the terminal apparatus and then displayed on a screen of the terminal apparatus.

In the present disclosure, an index for identifying the degradation in the accuracy of recognition has been described using the term "stability," however, an index having the substantially same technical meaning may be represented by another term such as "instability."

Although preferred embodiments of the present disclosure are described above with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

Note that the following configurations are within the scope of the present disclosure.

(1) An image processing apparatus, comprising:
a recognizing unit configured to recognize a position or a posture of a real object projected in an image; and
a display control unit configured to change a display of a virtual object related to the real object according to stability of recognition made by the recognizing unit.

(2) The image processing apparatus according to (1), wherein the display control unit displays the virtual object on a display device for the virtual object to track a position or a posture of the real object.

(3) The image processing apparatus according to (2), wherein the display control unit changes a tracking pace of the virtual object for the real object according to the stability.

(4) The image processing apparatus according to (3), wherein the display control unit set the tracking pace of the virtual object for the real object faster when the stability is higher.

(5) The image processing apparatus according to any one of (1) to (4), wherein the display control unit changes either or both of a static attribute and a dynamic attribute related to a display mode of the virtual object according to the stability.

(6) The image processing apparatus according to any one of (1) to (5), further comprising a determining unit configured to determine the stability.

(7) The image processing apparatus according to (6), wherein the determining unit determines the stability based on a temporal change in a state quantity of the real object recognized by the recognizing unit, and
the state quantity of the real object relates to at least one of a position, a posture, and a scale of the real object.

(8) The image processing apparatus according to (6), wherein
the determining unit determines the stability based on consistency between a first state quantity and a second state quantity of the real object recognized by the recognizing unit, and
each of the first state quantity and the second state quantity of the real object relates to at least one of a position, a posture, and a scale of the real object.

(9) The image processing apparatus according to (6), wherein, when the real object recognized by the recognizing unit includes a part which is not projected in the image, the determining unit determines that the stability is lower than when the whole real object is projected in the image.

(10) The image processing apparatus according to (6), further comprising:
an imaging unit configured to capture the image; and
a motion sensor configured to measure a motion of the imaging unit,
wherein the determining unit determines the stability based on consistency between a change in a state quantity of the real object recognized by the recognizing unit and a motion of the imaging unit measured by the motion sensor, and
the state quantity of the real object relates to at least one of a position, a posture, and a scale of the real object.

(11) The image processing apparatus according to (6), wherein the determining unit determines the stability based on consistency between a change in a state quantity of the real object recognized by the recognizing unit and a direction of a motion of a real space shown in a plurality of input images, and
the state quantity of the real object relates to at least one of a position, a posture, and a scale of the real object.

(12) The image processing apparatus according to any one of (1) to (11), wherein, when the stability is low, the display control unit displays information prompting a user to take an action for increasing the stability.

(13) The image processing apparatus according to any one of (1) to (12), wherein, when a predetermined user input is detected, the display control unit causes a display device to perform a display of the virtual object under the assumption that the stability is high regardless of the stability of recognition made by the recognizing unit.

(14) The image processing apparatus according to any one of (1) to (13), wherein the virtual object is an indication representing that the real object has been recognized.

(15) The image processing apparatus according to any one of (1) to (13), wherein the virtual object is information content related to the recognized real object.

(16) The image processing apparatus according to any one of (1) to (13), wherein the display control unit causes an indication representing that the real object has been recognized and information content related to the recognized real object to be displayed on a display device as the virtual objects, and changes a display of either of the indication and the information content according to the stability.

(17) A display control method, comprising:
recognizing a position or a posture of a real object projected in an image; and changing a display of a virtual object related to the real object according to stability of the recognition.

(18) A program causing a computer that controls an image processing apparatus to function as:
a recognizing unit configured to recognize a position or a posture of a real object projected in an image; and
a display control unit configured to change a display of a virtual object related to the real object according to stability of recognition made by the recognizing unit.

REFERENCE SIGNS LIST

100 Image processing apparatus
102 Imaging unit
104 Sensor unit
140 Image recognizing unit
160 Determining unit
190 Display control unit

What is claimed is:
1. An apparatus, comprising:
a camera configured to capture an image;
a sensor; and
circuitry configured to:
recognize a real object in the image;
compare at least one of:
a current position of the real object with at least one prior position of the real object, or
a current posture of the real object with at least one prior posture of the real object;
determine first motion information of the real object based on the comparison;
obtain, from the sensor, second motion information of the camera; and
control a display of a virtual object based on a comparison of a rotation of the real object corresponding to the first motion information with the second motion information of the camera.
2. The apparatus according to claim 1, wherein the control of the display of the virtual object includes an adjustment of at least one attribute corresponding to the display of the virtual object.

3. The apparatus according to claim 1, wherein the control of the display of the virtual object includes a display of information that indicates a message corresponding to the image.

4. The apparatus according to claim 3, wherein the displayed information indicates a moving direction of the camera.

5. The apparatus according to claim 1, wherein
the circuitry is further configured to control a display of information based on a recognition that at least one of the current position of the real object matches the at least one prior position of the real object or the current posture of the real object matches the at least one prior posture of the real object, and
the information indicates a message corresponding to the image.

6. The apparatus according to claim 1, wherein the circuitry is further configured to set a value of transparency of the virtual object than a threshold value in the image.

7. The apparatus according to claim 1, wherein the apparatus is a head mounted display (HMD).

8. The apparatus according to claim 1, wherein the circuitry is further configured to recognize a user line of sight.

9. The apparatus according to claim 1, wherein the apparatus is a portable device.

10. A method, comprising:
recognizing, by circuitry, a real object in an image captured by a camera;
comparing, by the circuitry, at least one of:
a current position of the real object with at least one prior position of the real object, or
a current posture of the real object with at least one prior posture of the real object;
determining, by the circuitry, first motion information of the real object based on the comparison;
obtaining, by the circuitry, second motion information of the camera from a sensor; and
controlling, by the circuitry, a display of a virtual object based on a comparison of a rotation of the real object corresponding to the first motion information with the second motion information of the camera.

11. A non-transitory computer-readable medium having stored thereon computer-executable instructions, which when executed by a processor of an information processing apparatus, cause the processor to execute operations, the operations comprising:
recognizing a real object in an image captured by a camera;
comparing at least one of:
a current position of the real object with at least one prior position of the real object, or
a current posture of the real object with at least one prior posture of the real object;
determining first motion information of the real object based on the comparison;
obtaining, from a sensor, second motion information of the camera; and
controlling a display of a virtual object based on a comparison of a rotation of the real object corresponding to the first motion information with the second motion information of the camera.

* * * * *